United States Patent [19]

Bertsch-Frank et al.

[11] Patent Number: 4,968,500

[45] Date of Patent: Nov. 6, 1990

[54] CONTINUOUS METHOD FOR PREPARATION OF GRANULATED SODIUM PERBORATE

[75] Inventors: Birgit Bertsch-Frank; Klaus Mueller; Thomas Lieser, all of Hanau, Fed. Rep. of Germany

[73] Assignee: Degussa Aktiengesellschaft, Frankfurt am Main, Fed. Rep. of Germany

[21] Appl. No.: 355,845

[22] Filed: May 17, 1989

Related U.S. Application Data

[63] Continuation of Ser. No. 202,363, Jun. 6, 1988, abandoned.

[30] Foreign Application Priority Data

Feb. 13, 1988 [DE] Fed. Rep. of Germany ....... 3804509

[51] Int. Cl.$^5$ .............................................. C01B 15/12
[52] U.S. Cl. .................................. 423/281; 23/313 R; 23/313 FB; 159/48.1
[58] Field of Search .......... 423/281; 23/313 R, 293 R

[56] References Cited

U.S. PATENT DOCUMENTS

| | | |
|---|---|---|
| 3,555,696 | 1/1971 | Pistor et al. .............................. 34/9 |
| 4,002,434 | 1/1977 | Simmersbach et al. ............ 423/281 |
| 4,115,519 | 9/1978 | Brichard et al. ...................... 423/279 |
| 4,185,960 | 1/1980 | Brichard et al. ...................... 423/281 |
| 4,215,097 | 7/1980 | Brichard et al. ...................... 423/279 |
| 4,681,748 | 7/1987 | Doetsch et al. ...................... 423/279 |

Primary Examiner—Gary P. Straub
Assistant Examiner—Lori F. Cuomo
Attorney, Agent, or Firm—Beveridge, DeGrandi & Weilacher

[57] ABSTRACT

The spray drying of a solution containing hydrogen peroxide and sodium metaborate to obtain primary particles which are immediately conveyed after leaving the drying zone to a granulating device and are then granulated in the presence of free and/or perborate water of crystallization. The granulated materials are dried, if necessary. The generally amorphous primary particles are converted into granulated materials with at least partially crystalline structure and significantly improved shelf life. The work is performed with advantage in a spray dryer with integrated fluid bed or in a compressing granulating device. The method is suitable for preparing perborate granulated materials with over 10% by wt., especially perborate monohydrate granular materials with 14–16% by wt. active oxygen.

15 Claims, 2 Drawing Sheets

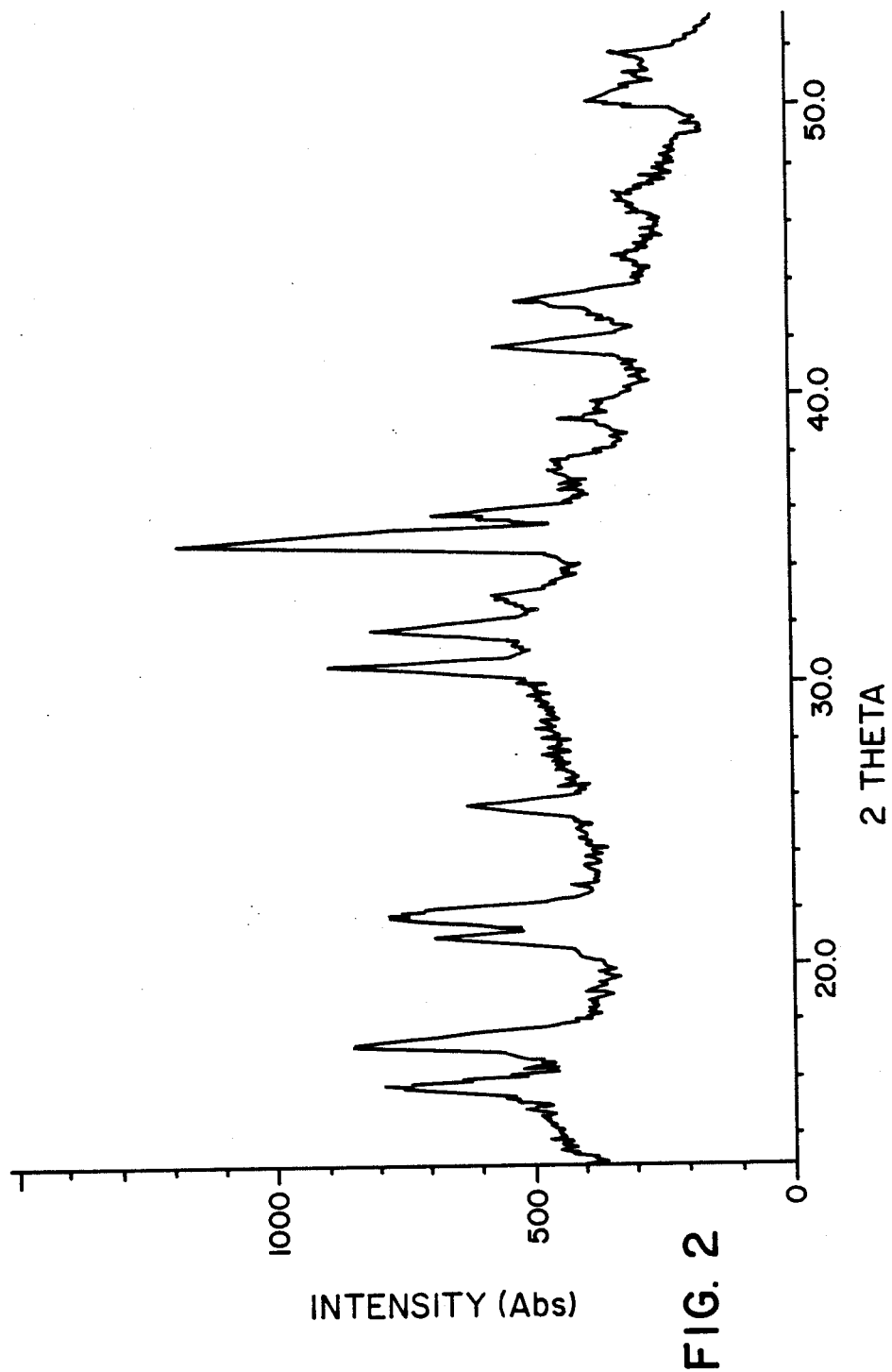

CONTINUOUS METHOD FOR PREPARATION OF GRANULATED SODIUM PERBORATE

This application is a continuation of application Ser. No. 202,363 filed 6/6/88 now abandoned.

INTRODUCTION AND BACKGROUND

The present invention relates to a continuous method for the preparation of granulated sodium perborate with an active oxygen content over 10% by weight. More especially, the present invention relates to sodium perborate monohydrate granulated materials with an active oxygen content of approximately 14 to 16% by weight made by means of spraying an aqueous solution containing hydrogen peroxide and sodium metaborate in a spray dryer and immediately thereafter granulating the primary particles obtained from the spray dryer.

Sodium perborate, a known material, is used both in the form of the so-called tetrahydrate and in the form of the so-called monohydrate in detergent, bleaching and cleaning agents. As used herein, the term "sodium perborates" denotes products with the typical 6-membered ring structure represented by the formula:

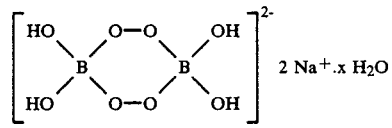

When $x=0$, the compound is sodium perborate monohydrate; when $x=4$, the compound is sodium perborate trihydrate and when $x=6$, the compound is sodium perborate tetrahydrate. The designations for the various perborates employed above and also in the following description do not correspond to the scientific nomenclature, but they are common forms in the art.

In addition to the active oxygen content, the exterior form, the nature of the surface, the grain size distribution, the bulk density, the shelf life and the rate of dissolution play an important part for the selection of a perborate for a specific application, e.g. as sole bleaching agent or in combination with activators or peroxycarboxylic acids. Accordingly, many methods are directed toward influencing these parameters by means of the method of preparation.

Sodium perborate tetrahydrate is normally prepared by reacting hydrogen peroxide with sodium metaborate in aqueous solution followed by crystallization. Sodium perborates with an available oxygen content ($O_a$) of over 10.4% by wt., especially sodium perborate monohydrate with an $O_a$ content of approximately 15 to 16% by wt., are obtained either by the dehydration of perborate tetrahydrate or by drying a finely distributed aqueous solution containing hydrogen peroxide and sodium metaborate.

The preparation of sodium perborate monohydrate by means of the dehydration of sodium perborate tetrahydrate is practiced on an industrial scale but is expensive because two stages are required, namely, the preparation and isolation of the tetrahydrate and its dehydration. The dehydration conditions must be adapted to the desired properties of the perborate monohydrate, whereby the energy efficiency and/or the space-time yield are unsatisfactory.

The attempt has therefore already been made to obtain sodium perborate with an available oxygen content over 10.4% by wt. directly, that is, without first preparing the perborate tetrahydrate.

DA-AS No. 17 92 273 teaches a method for the preparation of alkali perborates, especially of products low in water of crystallization with correspondingly high active oxygen contents by reacting suitable alkali compounds with a carrier for active oxygen and spray drying, whereby the active oxygen carrier is added to the spray batch immediately prior to the atomization. An aqueous solution containing hydrogen peroxide and sodium metaborate is preferably sprayed and dried. Products prepared according to this method with an $O_a$ content around 15% by wt. are in general in very finely powdered form. Consequently, their use in detergents is problematical due to the unavoidable formation of dust. The material parameters no longer satisfy the requirements being placed on perborates today.

The method of DE-OS No. 35 05 158 is based on the same principle, namely, the spray drying of a solution or suspension containing $H_2O_2$ and Na-metaborate. The concentration of borate, calculated as $B_2O_3$, in the spray batch is limited to 90–130 g/l and the molar ratio of $H_2O_2$ to $B_2O_2$ is 2.0:1 to 4.2:1. A sodium perborate with an active oxygen content of over 16% by wt. is obtained at an outlet air temperature in the spray dryer at 55° to 120° C., preferably 60° to 95° C.

The particle size distribution is particularly in a range of 10 to 20 μm; furthermore, the particles are amorphous; the bulk weight is in a range of 0.2 to 0.4 g/ml. As was the case in the older methods practised in the past, the fineness of the product hampers its applicability for many purposes. In particular, the rate of dissolution is considerably reduced in comparison to perborate monohydrate; the particles remain suspended in water or even collect on the surface. These are properties which raise a question as to trouble-free use as bleaching agents in detergents.

It is possible to build the fine particles up into granular materials that range in size of 100 to 300 μm in diameter. However, a method for accomplishing this is not apparent from DE-OS No. 35 05 158 and neither are the above disadvantages eliminated.

DE-OS No. 26 50 225 teaches a method of preparing granulated sodium perborate monohydrate wherein a 5 to 75% by wt. aqueous solution containing hydrogen peroxide and a 5 to 40% by wt. aqueous solution containing sodium metaborate are sprayed into a fluid-bed drier containing nuclei at a fluid-bed temperature of up to 100° C. and the water is evaporated with the swirling gas. In this method, the produce generated in the fluid bed must be sieved, even mechanically comminuted, if necessary, and the perborate monohydrate with dimensions smaller than that to be prepared is recycled. The high expenditure of energy, the unfavorable particle size distribution obtained at first, which requires a comminution, as well as the constant recycling of nuclei are considered disadvantageous.

If very fine perborates, produced e.g. according to DE-AS No. 17 92 273 or DE-OS No. 35 05 158, are used as a starting point, granulation methods for building up more coarse products which can be used in detergents can be considered. However, success can not be predicted, especially in the granulation of perborates. Thus, perborate tetrahydrate with a particle size of 0.05 to 0.3 mm was granulated by means of mechanical action of the particles on each other in the presence of adhering water and optional binders in DE-PS No. 10

37 432. However, a heat treatment had to follow and preferably binders with an "explosive" action had to be used in order to disadvantageously affect the rate of dissolution by the granulation. This patent also points out the possibility of using other perborate hydrates. Nevertheless, examples or even suggestions are not given how to convert sodium perborate monohydrate with an average particle diameter of approximately 5 to approximately 50 μm in an industrially simple manner into granulated materials with satisfactory abrasion resistance at a high rate of dissolution.

U.S. Pat. No. 4,002,434 shows treatment of sodium perborate monohydrate wherein the sodium perborate monohydrate is moistened with water or aqueous solutions at 20°–90° C. and dried in a fluid-bed drier, a device customary for granulations. This method does improve the abrasion; however, this patent contains no description of granulation occurring at the same time.

DE-PS No. 26 52 488 teaches a method of preparing granular materials from zeolites and oxygen-releasing compounds. Sodium peroxoborate is also mentioned; however, it is used as a moist product obtained from the centrifuge. This document yields no suggestions about the preparation of spray-dried, amorphous perborates and their granulation. Moreover, the products according to DE-PS No. 26 52 488 limit the usage of the peroxoborate contained in them.

Due to the unsatisfactory properties of the sodium perborates available by spray drying as well as due to the problems to be expected with a separate granulation of very fine particles which are first isolated, it was not obvious to combine these method steps with one another in expectation of obtaining granulated sodium perborate which can be used with success in detergents and bleaching agents.

SUMMARY OF THE INVENTION

The present invention has the object of creating an industrially simple method for the continuous preparation of granulated sodium perborate with an $O_a$ content over 10% by wt. The method of the invention comprises a direct preparation of primary particles by spray-drying an aqueous solution. The method is intended to permit obtaining granulated materials with a high active oxygen content which exhibit a good shelf life and are effective as bleaching agents as well as permit a reliable adjustment of the bulk weight, the particle size distribution and rate of dissolution of the granular materials.

This object as well as other objects are achieved in accordance with the present invention by means of a continuous method for the preparation of sodium perborate granulated materials with an $O_a$ content over 10% wt., preferably 14 to 16% by wt., by the method of spraying an aqueous solution containing hydrogen peroxide and sodium metaborate and drying the sprayed droplets by means of a heated gas. In carrying out the invention, the primary particles are conveyed immediately after having left the drying zone of the spray dryer to a granulating device. There, in the granulating device, the primary particles are granulated in the presence of free and/or perborate water of crystallization and the resulting granulated materials are dried, if necessary.

It is essential for the present invention that the primary particles, which term designates the basically solid particles obtained by spray-drying, are supplied immediately after having left the drying zone of the spray dryer to the granulating device. This measure makes it possible to obtain granulated materials with the desired properties without an isolation of the primary particles being necessary. A considerable advantage of the method resides in the fact that there are no problems with dust resulting from the very fine product formed at first.

The term "immediately" signifies that the primary particles leaving the drying zone of the spray dryer are supplied to the granulating device without appreciable cooling and without intermediate storage. This method of operation is advantageous as regards energy and creates favorable conditions for the granulation.

The primary particles formed, in the spray dryer and which are generally amorphous at first are surprisingly converted by means of the granulation performed in accordance with the invention into at least partially crystallized granulated materials. The degree of crystallinity is determined both by the reaction conditions of the method such as temperature and dwell time and also by the amount and in what manner the required water is added. A determination can be made in a known manner by measuring the distribution of intensity of X-ray diffraction patterns of powders whether and to what extent the product tested is crystalline. In addition, the granulation also significantly increases the shelf life during storage in a warm, moist atmosphere. Thus, the granulation obviously not only builds up larger particles but rather at the same time the properties of the perborate are considerably changed, rendering it suitable for practicable use in detergents and cleaning agents.

A spray-dried perborate monohydrate prepared according to DE-PS No. 17 92 273 with an active oxygen content of 15% by wt. loses up to 10% (relative) of its content after only a few days. In contrast thereto, sodium perborate monohydrate granulated materials prepared in accordance with the invention generally lose less than 5% (relative) of the initial content under the same storage conditions within 6 weeks of storage.

The diameter of the spray-dried primary particles is usually in a range of approximately 5 to 50 μm. The particle size and particle distribution of the granulated materials can vary within wide limits. Important influencing factors in that respect are the moisture content of the system, the temperature, the dwell time in the granulating device, the compression action of the granulating device as well as the type and amount of any auxiliary granulating agents present. In general, the granulation is performed in such a manner that the dust portion (under 0.1 mm) and the coarse portion (greater than 0.5 mm) are each under 5% by wt., preferably under 2% by wt., of the granulated material. The person skilled in the art can determine the conditions by means of preliminary tests. Of course, the dust portion can be returned after separation from the granulated material into the granulating stage and the coarse portion can also be utilized.

The bulk density of the granulated material is a function not only of the particle size distribution but also of the compression during granulation. When a low-compression granulating device is used, which includes a granulation in a fluidized bed, a granular material with a rather low bulk density is obtained, e.g. a density in the range of 0.3 to 0.6 g/ml. If a granulating device with a greater compression is used, e.g. a continuously operating mixer or a drum with revolving scoops or screws, bulk densities of generally 0.4 to 1.0 g/ml. are obtained.

The granulation of the primary particles is performed in the presence of free water and/or perborate water of crystallization. The free water can be supplied to the system by means of spraying with fine spray jets directed onto the material in the granulating device. It is also advantageous to spray the primary particles with water in addition or alternatively immediately after they leave the drying zone of the spray dryer. The water to be sprayed can also contain customary auxiliary granulating agents and/or hydrogen peroxide, boric acid or a sodium-boron compound as are known in the art. Particularly suitable auxiliary granulating agents are aqueous solutions containing water glass, alkali borates and alkali perborates, magnesium sulfate, Na hexamethaphosphate, organic polymers such as starch, agar, xanthane, carboxymethylcellulose, polyacrylates, polyvinyl alcohol or mixtures of such substances. A person skilled in this art can determine the amount of water necessary for spraying, the direction and number of spray jets and the amount of auxiliary granulating agents to be used therewith by means of orienting tests in the device provided for spray-drying and granulating. If desired, the water to be sprayed for granulation can also contain active-oxygen stabilizers such as chelate complexing agents containing amino and carboxyl groups or amino and phosphonate groups and can contain surface-active substances, especially non-ionic tensides (surface active agents) such as alkylbenzene polyglycol ether, as well as bleaching activators capable of forming peroxycarboxylic acid.

Instead of spraying the primary particles with water or an aqueous solution, it is also possible to make the moisture available by introducing a gas containing water vapor, preferably in the form of moist, heated air. The spraying and the supplying of moist air can also be combined with one another. It is advantageous to use part of the drying air leaving the spray dryer with an average temperature, that is, approximately 50° to approximately 100° C., preferably approximately 60° to 90° C., as the moist, heated air, which can be further moistened, if necessary.

As has already been described, the granulation can also be performed in the presence of perborate water of crystallization. In this manner, perborates containing water of crystallization in accordance with the initially indicated formula are present with x greater than zero, preferably 4 to 6. Such perborates can result from not completely dried, sprayed material in the form of primary particles.

Alternatively or in addition, finely distributed sodium perborate tetrahydrate or a melt thereof which are brought into the granulating zone, e.g. by being blown in or by means of a screw or by spraying, can also serve as a source for water. In this embodiment, the temperature of the material located in the granulating zone is preferably set at values at or just above the melting point of sodium perborate tetrahydrate, preferably approximately 60° to 75° C. The material leaving the drying zone of the spray dryer comes in intimate contact in the granulating zone with primary particles still containing water of crystallization and/or with added tetrahydrate. Melting processes occur hereby under the given temperature conditions, which makes the granulation possible and a dewatering of any tetrahydrate present to the monohydrate also occurs as an option. Naturally, the composition of the granulate is a function both of the chemical composition of the primary particles leaving the drying zone of the spray dryer and of the quantity ratio of primary particles to added tetrahydrate and/or water as well as of the temperature and dwell time in the granulating device. The heat in the granulating zone is supplied by the primary particles and optionally by means of heated air, preferably air with a relative moisture content over 50% and/or by means of contact heating. The intimate bringing in contact with each other of the material to be granulated with the moisture and/or with a perborate containing water of crystallization preferably occurs, as stated above, in a fluidized bed and/or a compressing granulating device.

The granulating of very fine sodium perborate monohydrate in the presence of or by means of the addition of sodium perborate tetrahydrate and obtaining of granulated material which exhibits an excellent particle size distribution and shelf life were not known up to the present invention.

If a so-called fluid bed with an impact flow bottom is used as granulating device, air is suitable fluidizing gas. The temperature of the air is generally 60° to 130° C. and preferably 60° to 90° C. if sodium perborate monohydrate granulated material is to be produced. The fluid bed device is designed in a customary manner and is equipped by means of an overflow dam and a removal device for the granulated material for continuous operation. The outlet air can be removed together with or separately from that of the spray dryer and can be cleaned of dust by means of dust separators such as cyclones.

If a fluid bed is used for granulating, the use of an auxiliary granulating agent is recommended which is sprayed as an aqueous solution onto the primary particles. Use of an effective amount; e.g., 0.1 to 10% by wt., preferably 0.5 to 3% by wt., in relation to the final product, of the binding agent, which is generally used as a 1 to 50% by wt. aqueous solution, results in a sufficient action. Sodium perborate tetrahydrate as auxiliary granulating agent added in solid form is especially suitable when compressing granulating devices are used.

According to an advantageous embodiment of the method of the invention, a granulating device integrated directly into the spray dryer is used, e.g. a spray dryer with integrated fluid bed. In this way there is provided a spray drying zone and a granulation zone in one vessel.

The drying air of the spray dryer usually enters into the spray dryer at 60° to 250° C., preferably 90° to 200° C. and in a particularly preferred manner at approximately 150° to 180° C. and leaves it at 50° to 200° C., preferably 50° to 100° C. and in a particularly preferred manner at 60° to 90° C.

Spray dryers with a customary design can be used, whereby the material to be sprayed and the drying air can be guided either in concurrent flow or in countercurrent flow. Considering the limited temperature stability of perborates, a concurrent flow guidance is preferable. Customary atomizing devices such as one-component jets or multi-component jets or centrifugal atomizers can be used to atomize the fluid material to be dried. Centrifugal atomizers are preferable. An expert can determine the operating conditions of the dryer, including temperature of the inlet and outlet air, air amount, feed amount, jet parameters by means of orienting tests, whereby the composition and moisture content of the primary particles has a great influence on the immediately following granulation. The dwell time of the sprayed particles in the drying zone of the spray dryer is usually in the range of a few seconds to approximately 30 seconds. The still-warm primary particles are supplied in time and preferably also spatially immediately thereafter to the granulation. It is an advantage of the method of the invention that no nuclei are brought into the spraying zone and the granular material is obtained within the desired grain area in a simple manner in a high yield.

The aqueous solution to be sprayed contains hydrogen peroxide and sodium metaborate as well as sodium perborate in equilibrium therewith. Customary available oxygen stabilizers and/or crystallization retarders such as sodium hexametaphosphate can also be present. These are matters well known in the art. A crystallization of sodium perborate prior to the spraying of the solution is not desirable. The solution is therefore generally prepared immediately prior to the spraying by bringing together an aqueous solution of hydrogen peroxide, preferably with a content of 30-85% by wt., and an aqueous solution or suspension of sodium metaborate with a content of 15-70% by wt., preferably 15-40% by wt.

Instead of sodium metaborate, another sodium borate or boric acid can also be used together with the appropriate amount of sodium hydroxide—the atomic ratio of Na:B should be approximately 1:1.

The molar ratio of hydrogen peroxide to sodium metaborate is preferably adjusted to 0.9 to 1.1, especially to 1.0 to 1.05 because this ratio results in accordance with the invention in perborates with an $O_a$—boron atomic ratio around 1 and thus also in sodium perborate granulated materials with $O_a$ values of approximately 10 to 16%, especially sodium perborate monohydrate granular material with 14 to 16% by wt. active oxygen.

The reaction enthalpy released during the preparation of the solution by bringing the reactants into contact with each other can be used with preference to reduce the energy requirement during drying. The concentration of the aqueous solution to be sprayed can be within broad limits, namely, from approximately 5 to approximately 50% by wt., calculated as $NaBO_2$. Concentrations in a range above approximately 40% by wt. are less preferable on account of the high viscosity. Concentrations under 10% by wt. are possible but the economy is reduced. A concentration between 15 and 25% by wt. is especially preferable for the preparation of sodium perborate monohydrate granular materials.

The $O_a$ content of the perborate granular material is determined at a given molar ratio of $O_a$:boron in the spray solution by the conditions, especially temperature, moisture and dwell time, in the spray dryer and in the granulating device or zone and any optional downstream dryer or zone. A conversion of the active oxygen to evolvable oxygen can occur at a temperature of the primary particles over approximately 80° C., especially in the case of a rather long dwell time.

The granulated materials, especially the sodium perborate monohydrate granulated materials prepared in accordance with the invention generally dissolve very rapidly. The rate of dissolution is somewhat retarded by using water glass as auxiliary granulating agent in relation to sodium perborate monohydrate obtained in a conventional manner by dehydration of the tetrahydrate. The abrasion of the monohydrate granulated materials obtained in accordance with the invention is within the range of the products on the market.

The technical advance of the method of the invention resides in the fact that sodium perborate granulated materials, preferably sodium perborate monohydrate granulated materials, can be prepared directly from readily accessible raw materials. The method is variable as regards the parameters of the materials; these parameters can be readily adapted to the particular end product desired. The disadvantage of the insufficient shelf life of spray-dried sodium perborate monohydrate is able to be eliminated by means of the granulation in the presence of water which follows according to the invention directly after the spray drying.

BRIEF DESCRIPTION OF DRAWINGS

FIG. 2 is a plot of the diffractometer data of example 1(b).

DETAILED DESCRIPTION OF THE INVENTION

Figure 1:
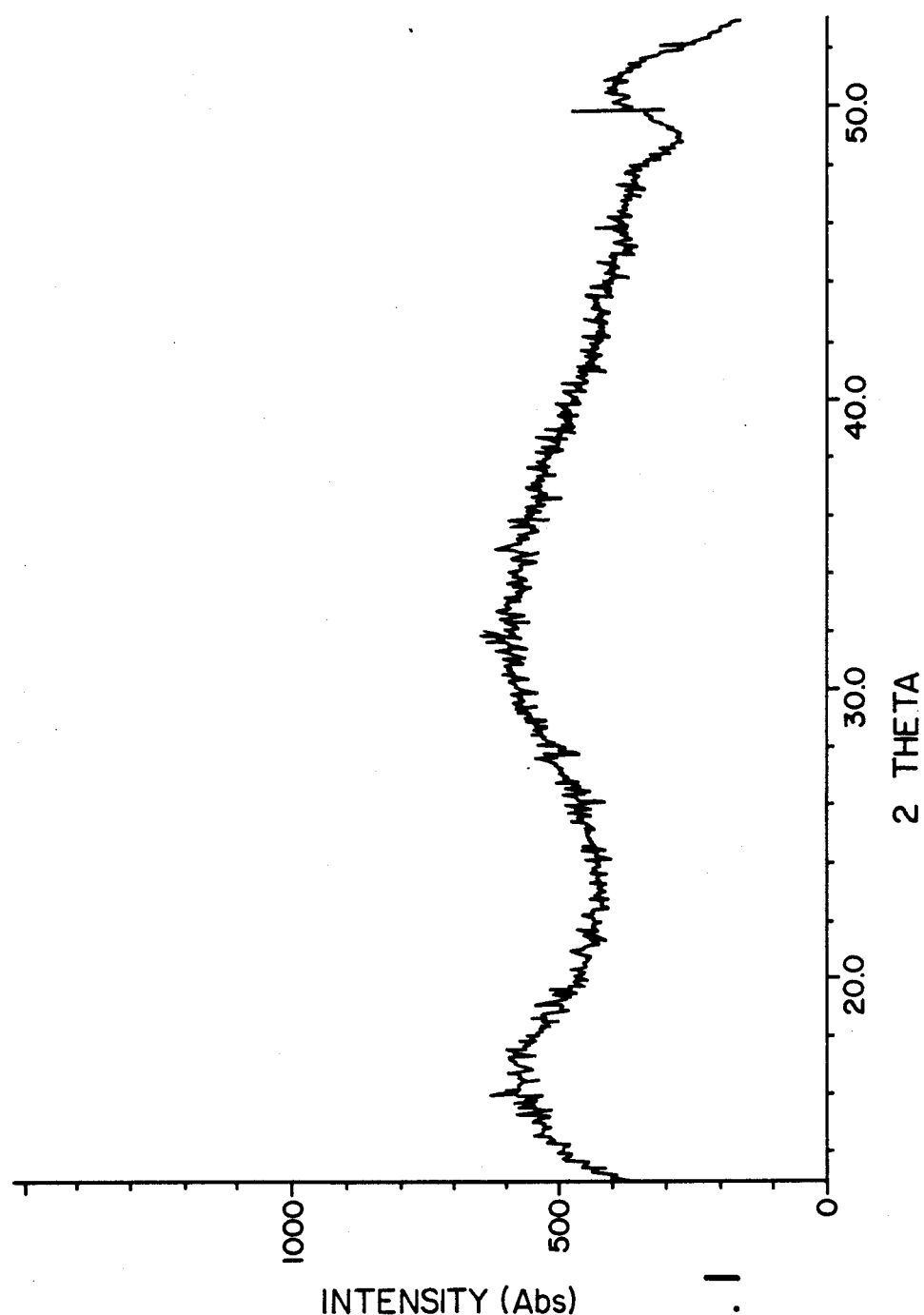
FIG. 1 is a plot of the diffractometer data of example 1(a).

The method will now be explained in more detail in the examples.

EXAMPLE 1

The apparatus consisted of a spray dryer with integrated fluid bed. The spray dryer, which was cylindrical in its upper part (diameter 1.6 m, height 1.0 m) and tapered down conically in its lower part, contained a centrifugal atomizer as well as the supply parts for the drying air centrally located on its upper cover; the outlet for the air was located peripherally on the upper part and followed by a cyclone. A cylindrical fluid bed device with impact flow bottom (area 3 dm$^2$), overflow dam and removal device was located directly under the conically tapered part of the spray dryer. A spray jet for spraying in water or an aqueous solution of auxiliary granulating agents was centrally located between the spray dryer zone and the fluid bed device. The apparatus also contained devices for heating and regulating the flow amount of the air for the spray dryer and the fluid bed.

The spray solution was prepared by mixing aqueous hydrogen peroxide (70% by wt. $H_2O_2$) with aqueous $NaBO_2$ (19.1% by wt. and stabilized with $MgSO_4$. The Oa:B atomic ratio was 1.0, the concentration of the solution, calculated as $NaBO_2$, 16.7% by wt. The spray solution also contained 0.1% by wt. $MgSO_4$ as stabilizer.

Operating conditions

| | |
|---|---|
| Air inlet spray dryer | 180° C. |
| Air outlet spray dryer | 76° |
| Air inlet spray dryer | 90° |
| Air amount spray dryer | 750 kg/hr. |
| Air amount spray dryer | 140 kg/hr. |
| Feed amount to the spray dryer | 45 kg/hr. |
| Atomizer of the spray dryer | 25,000 rpms |
| Temperature of the fluid bed | 66° C. |
| Spraying the primary particles with a 35% by wt aqueous solution of water glass (SiO$_2$/Na$_2$O = 3.3) in an amount of | 1.7 kg/hr. |
| Production (total) | 12.0 kg/hr. |

Material data of the products obtained (a) Primary particles (from the cyclone)

| | | |
|---|---|---|
| Particle size | 32-63 μm | 36% |
| | 20-32 μm | 34% |

| | | |
|---|---|---|
| | <20 μm | 30% |

The primary particles contained an $O_a$ content of 15.6% by wt. The primary particles were essentially amorphous, cf. FIG. 1 of the diffractometer pattern with $CuK_\alpha$ radiation range of 11°–59° (2 theta).

(b) Granulated materials

| Particle size | >0.8 mm | 5.8% |
|---|---|---|
| | <0.1 mm | 3.7% |
| Bulk density | | 480 g/l |
| $O_a$ content | | 15.1% by wt. |

The granulated materials exhibited at least partially crystalline structure, cf. diffractometer pattern with $CuK_\alpha$ radiation in a range of 11°–59° (2 theta), FIG. 2.

(c) Shelf life: Oa content (relative when stored at 30° C. and 80% rel. air moisture

| | after 1 wk | after 2 wks | after 6 wks |
|---|---|---|---|
| Primary particles (*) | 97.1 | 88.8 | 68.3 |
| Granular material (*) | 98.4 | 98.3 | 96.7 |
| (*) according to example 1 | | | |
| By way of comparison: Sodium perborate monohydrate, Oa 15.6%; | | | |
| Prepared by dehydration of sodium perborate tetrahydrate | 95.8 | 94.2 | 94.8 |

EXAMPLE 2

An aqueous solution of the following composition was atomized in the spray dryer in the apparatus according to example 1: 14.3% by wt. $NaBO_2$ and 7.3% by wt. $H_2O_2$. The operating conditions correspond basically to those of example 1 except for:

| Feed amount to the spray dryer | 40 kg/hr. |
|---|---|
| Air amount fluid bed | 145 kg/hr. |
| Inlet air to the fluid bed | 100° C. |
| Fluid bed temperature | 65° |

The primary particles were sprayed with 3 kg/hr. of an aqueous solution of the same composition as the solution supplied to the spray dryer. 9.2 kg/hr. granulated material is obtained.

$O_a$ content of the granulated material: 15.4% by wt.

The granulated material obtained exhibited only 2.1% by wt. under 0.1 mm and 3.4% by wt. over 0.8 mm. The rate of dissolution was 0.5 minutes (measured with 2 g/l at 15° C.). $O_a$ decreases (relative) after 6 weeks of storage at 30° C. and 80% rel. air moisture 4%.

EXAMPLE 3

The apparatus of a spray dryer and a cylindrical intensive mixer with vortex implement and radiation heating as well as a feed device for feeding powdery sodium perborate tetrahydrate into the mixer inlet.

A granulated mixture which was partially dehydrated during granulation is obtained by spray-drying a solution according to example 1, dosing in solid, powdery sodium perborate tetrahydrate—1 part by wt. per 3 parts by weight primary particles—and granulating at 72° C.:

| Available oxygen ($O_a$) | 14.9% by wt. |
|---|---|
| Rate of dissolution (2 g/l at 15° C.) | <0.5 min. |
| Bulk weight | 820 g/l |
| Size fraction 0.1 mm: | 9.7% |
| Size fraction 0.8 mm: | 12.1% |

Further modifications and variations of the foregoing invention will be apparent to a person skilled in the art and are intended to be encompassed by the appended claims.

German priority document No. P 38 04509.5 is relied on and incorporated by reference herein.

We claim:

1. A continuous method for the preparation of granulated perborate with an Oa-content of 14 to 16% by weight comprising the steps of:
spraying an aqueous solution comprising hydrogen peroxide and sodium metaborate in a molar ratio of 0.9 to 1.1 into a drying zone to form droplets, wherein no nuclei of perborate are introduced into said drying zone, drying said droplets by means of a heated gas in said drying zone to thereby form powdery, essentially amorphous sodium perborate, conveying said powdery perborate after leaving said drying zone to a separate granulating zone, separated from said drying zone, adding water in sprayed form, vapor form, in the form of perborate containing water of crystallization or in the form of sodium perborate tetrahydrate to said powdery perborate and granulating by intimately bringing into contact said water and powdery perborate.

2. The method of claim 1 wherein sodium perborate tetrahydrate is used as auxiliary granulating agent and the granulation is performed at 60° to 75° C.

3. The method according to claim 1 wherein the granulation is performed by compression of the perborate.

4. The method according to claim 3 wherein granulation in a fluidized bed is used to obtain a product with bulk density in the range of 0.3 to 0.6 g/ml.

5. The method according to claim 3 wherein granulation of sufficient compression is used to obtain a product with a bulk density of 0.4 to 1.0 g/ml.

6. The method according to claim 1 wherein the water is introduced into said granulating zone.

7. The method according to claim 1 wherein the water is introduced to said perborate immediately after leaving the drying zone.

8. The method according to claim 1 wherein an auxiliary granulating agent is present in the water used in sprayed form.

9. The method according to claim 1 wherein the water further contains an active oxygen stabilizer or surface active agent, or bleaching activator or mixture thereof.

10. The method according to claim 1, wherein the droplets and the heated gas are in a concurrent flow.

11. A continuous method for the preparation of granulated perborate with an Oa-content of 14 to 16% by weight, comprising the steps of:
spraying an aqueous solution comprising hydrogen peroxide and sodium metaborate in a molar ratio of 0.9 to 1.1 into a drying zone to form droplets, wherein no nuclei of perborate are introduced into said drying zone, drying said droplets by means of a heated gas in said drying zone to thereby form powdery, essentially amorphous sodium perborate, conveying said powdery perborate after leaving said drying zone to a granulating zone, adding water in sprayed from to said powdery perborate and granulating by intimately bringing into contact said water and powdery perborate.

12. The method according to claim 11 wherein granulation in a fluidized bed is used to obtain a product with bulk density in the range of 0.3 to 0.6 g/ml.

13. The method according to claim 11 wherein granulation of sufficient compression is used to obtain a product with a bulk density of 0.4 to 1.0 g/ml.

14. The method according to claim 11 wherein the water is introduced into said granulating zone.

15. The method according to claim 11 wherein the water is introduced to said perborate immediately after leaving the drying zone.

* * * * *